Sept 10, 1957     M. PANICH     2,805,682
FLUID PRESSURE RECEIVER
Filed Feb. 8, 1954
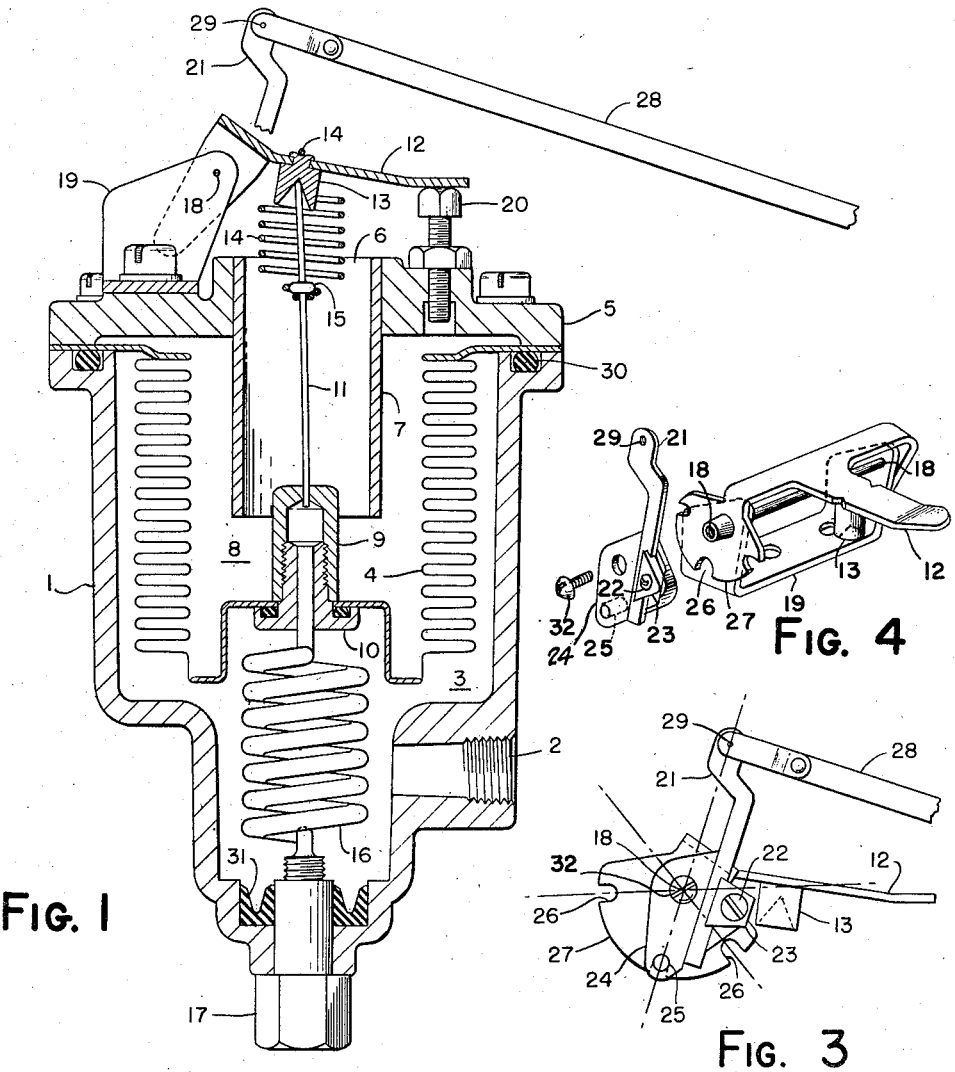
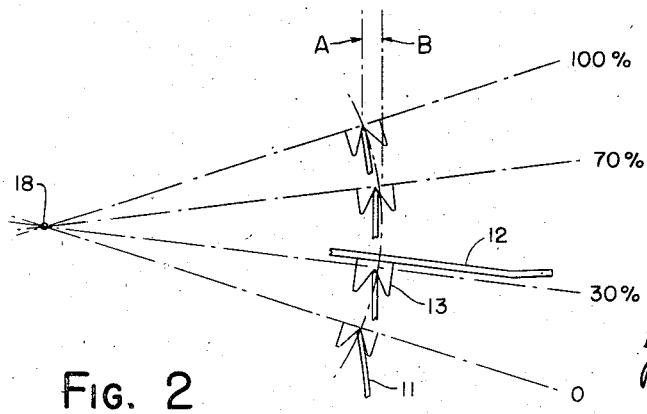
*INVENTOR.*
MICHAEL PANICH
BY
Raymond D. Junkins
ATTORNEY

United States Patent Office 2,805,682
Patented Sept. 10, 1957

2,805,682

FLUID PRESSURE RECEIVER

Michael Panich, Mayfield Heights, Ohio, assignor to Bailey Meter Company, a corporation of Delaware Application February 8, 1954, Serial No. 408,725

2 Claims. (Cl. 137—790)

This invention relates to a fluid pressure receiving device, for producing a linear movement in accordance with actuation of said device by a fluid pressure representative of a variable.

In the instrumentation field it is often necessary to provide a fluid pressure receiving device, which will actuate an indicating pointer or control device such as a pilot valve. This is particularly true in telemetering systems wherein the variable may be sensed and controlled at some distance from the operator, and, in such case, the fluid pressure established at the variable sensing device can be transmitted through instrument piping to the device of my invention to give an indication of the variable.

It is important in indicating such value that the pointer is actuated by the fluid pressure receiving device without any errors in linearity or hysteresis. This is also true if the pressure receiving device is positioning the stem of a pilot valve, or changing the relation of a nozzle and vane type pilot valve, for example.

Additionally, such fluid pressure receivers are generally located in instrument casings, and, for their most flexible utilization, it is well that they be adaptable to be positioned in at least the four quadrants of the instrument casing without their location affecting linearity, angularity or hysteresis in actuating the indicating device or control device.

Thus, a specific object of my invention is to provide a fluid pressure receiving device which actuates a drive linkage means, which may be connected as set out above, in a linear manner, and without hysteresis.

Another object of my invention is to provide a linear responsive fluid pressure receiver which is particularly adaptable to be placed in various positions in an instrument casing while actuating indicating means or control means in a linear manner.

A further object of my invention is to provide a fluid pressure receiving device having a minimum of structure to perform as set out above.

Other features of my invention are set out in the following specifications and the appended claims.

I disclose in the drawings:

Fig. 1 is a sectional view of my fluid pressure receiving device.

Fig. 2 is a diagram of the operation of the lever arm and resilient rod of my invention.

Figs. 3 and 4 show details of adjustments between the lever arm and drive linkage.

In Fig. 1, I show the housing 1 of my fluid pressure receiving device with an opening 2 for the admission to a chamber 3 of fluid pressure from a means (not shown) establishing a fluid pressure representative of a variable. The fluid pressure in chamber 3 acts on the exterior of bellows 4 to move it upwardly, as shown on the drawing, when there is an increase in fluid pressure and to allow it to expand downwardly upon a decrease in fluid pressure. Bellows 4 is open to the atmosphere at the uppermost portion and closed at the lower portion, with the uppermost portion secured between housing 1 and cap 5.

An aperture 6 is provided in cap 5 with a cylindrical structure 7 extending downwardly into interior chamber 8 of bellows 4.

The lower portion of bellows 4 is secured between a spring holding member 10 and threaded connector 9. Secured to connector 9 is a resilient metal rod 11 which is held in contact with lever arm 12 at cone pivot member 13 by a connecting spring 14 which is anchored to rod 11 by bead connection 15.

Secured in spring holding member 10 is a helical spring 16 which is adjustably connected at its other end to adjustment member 17, exterior of housing 1. This is the zero adjustment for the fluid pressure responsive device.

Lever arm 12 is provided with a pivot 18 supported by a member 19 affixed to cap 5. Also mounted on cap 5 is a minimum stop screw 20. The maximum stop being the lowest portion of cylinder 7 mounted in cap 5, preventing further upward motion of bellows 4.

In operation, the fluid pressure enters at 2 and acts upon bellows 4 which in turn causes connector 9 and its cooperating member 10 to move in an upwardly direction, as viewed on the drawing, if the pressure is increasing, and in a downwardly direction if the pressure is decreasing. This movement of members 9 and 10 acts against the force of spring 16 when going in an upward direction, and at the same time, 11 is moved upwardly against cone pivot member 13 to move lever arm 12 in a counter-clockwise direction about pivot 18 to position arm 12 in accordance with the fluid pressure.

As pivot member 13 must move in a counter-clockwise direction about pivot 18, it is necessary that the end of resilient rod 11 maintain contact with pivot 13, and yet not cause distortion in the bellows 4 such as to introduce non-linearity and hysteresis errors into the positioning of lever 12. So that such errors will be avoided, I have provided a rod 11 of 1/32 inch diameter made of a resilient metallic material so that it can flex along its longitudinal axis as its uppermost end is contained in cone pivot member 13 by a connecting spring 14, as lever 12 is moved about pivot 18 by rod 11. The metallic material of the rod is such that it does not take a permanent set as it flexes in positioning lever 12, and the rod repeats its flexure in both the upward and downward direction, as viewed in the drawing, providing enough flexure in the rod to prevent distortion of the bellows 4.

I have shown in Fig. 2 that the lever arm 12 and rod 11 are so aligned that the rod is in a vertical position when the lever arm is at approximately 30% of its total arcuate travel. With such alignment the rod 11 will also be vertical at approximately 70% of the arcuate travel and thus the total flexure required of rod 11 is minimized as its uppermost end moves from limit line A to limit line B. Rod 11 is required to flex through only the distance from the vertical position to the limits A and B.

Figs. 3 and 4 depict the lever arm 12 connected to adjustable drive link 21. Specifically, an arcuate portion 27 of lever 12 is attached to indexing plate 24 which is joined to arcuate portion 27 by screw 32 drawing portion 27 onto a hub which is aligned with pivot 18. Further, indexing plate 24 has a pin 25 which engages a predetermined one of slots 26 to establish a fixed positional relationship with arcuate portion 27 when these members are drawn together with screw 32.

Drive linkage 21 is mounted on indexing plate 24 by being captured by retaining plate 23. Specifically, plate 23 is drawn toward plate 24 with screw 22 passing through plate 23 and threading into plate 24. As plate 23 is drawn toward plate 24, drive linkage 21 is captured between them. Of course, the effective length of drive link 21 may be set by determining the point of capture along its length. Drive link 21 and drive linkage member 28 are pivoted at 29. Linkage member 28 is in turn pivotally attached to either an indicator pointer (not shown) or to a pilot valve (not shown) or the like.

As support member 24 is pivoted at 18 it may be moved into any of the slots marked as 26 so that the drive link 21 can be placed in varied relationship to lever arm 12 as may be necessary dependent upon the location of housing 1 in the four main quadrants of an instrument casing (not shown). A zero adjustment is made available as previously mentioned by turning nut 17 thus adjusting the calibration of spring 16.

The housing 1 is shown sealed by O-ring 30 at the uppermost portion of the housing and at the lower portion of the housing by rubber sealing ring 31.

What I claim as new, and desire to secure by Letters Patent of the United States, is:

1. A fluid pressure responsive device for responding to fluid pressures representative of a variable including, a housing receiving fluid pressures, a bellows mounted in the housing and provided with a closed end responding to the fluid pressures and constituting a movable portion, an abutment member extending through and into the housing, said abutment member positioned axially of and in the path of travel of said movable portion thereby forming an abutment for the bellows moving in one direction, a resilient rod secured to the movable portion of the bellows and extending through the housing and having an end external of the housing, an adjustable loading spring secured to the movable portion of the bellows, a lever pivotally mounted external of the housing, said lever positioned in the path of travel of the rod, a cone pivot structure mounted on the lever at a point spaced from the pivot and in contact with the end of the rod, a bead connection mounted on the resilient rod, a connecting spring joining the cone pivot and resilient rod through the bead connection, the resilience of the rod coacting with the bellows to prevent distortion of the bellows, and an adjustable abutment mounted on the housing in the path of travel of the lever for limiting movement of the lever.

2. The device of claim 1 wherein the pivoted lever includes an arcuate portion having slots formed therein, an indexing plate, a pin portion on said plate engaging one of said slots thereby adjustably mounting said plate, and drive linkage means fixed to the plate to transmit the motion thereof.

References Cited in the file of this patent

UNITED STATES PATENTS

| | | |
|---|---|---|
| 1,340,399 | Ohlson | May 18, 1920 |
| 1,344,340 | Fulton | June 22, 1920 |
| 1,874,704 | Johnson | Aug. 30, 1932 |
| 2,079,069 | Johnson | May 4, 1937 |
| 2,091,319 | Howse et al. | Aug. 31, 1937 |
| 2,131,573 | Snediker | Sept. 27, 1938 |
| 2,274,254 | Newton | Feb. 24, 1942 |
| 2,603,973 | Wallace | July 22, 1952 |

FOREIGN PATENTS

| | | |
|---|---|---|
| 203,317 | Germany | Oct. 22, 1908 |